United States Patent
Bagnell et al.

(10) Patent No.: US 12,084,085 B1
(45) Date of Patent: Sep. 10, 2024

(54) SYSTEMS AND METHODS FOR AUTONOMOUS VEHICLE VALIDATION

(71) Applicant: Aurora Operations, Inc., Pittsburgh, PA (US)

(72) Inventors: James Andrew Bagnell, Pittsburgh, PA (US); Sanjiban Choudhury, Ithaca, NY (US); Michael Lee Phillips, Pittsburgh, PA (US); Arun Venkatraman, Mountain View, CA (US); Xinyan Yan, El Paso, TX (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/309,494

(22) Filed: Apr. 28, 2023

Related U.S. Application Data

(60) Provisional application No. 63/491,644, filed on Mar. 22, 2023.

(51) Int. Cl.
  *B60W 60/00* (2020.01)
  *B60W 40/09* (2012.01)
(52) U.S. Cl.
  CPC ........ *B60W 60/0015* (2020.02); *B60W 40/09* (2013.01)
(58) Field of Classification Search
  None
  See application file for complete search history.

(56) References Cited

U.S. PATENT DOCUMENTS

| | | | | |
|---|---|---|---|---|
| 11,150,660 | B1* | 10/2021 | Kabirzadeh | G05D 1/0088 |
| 11,415,997 | B1* | 8/2022 | Dolan | G06F 11/3688 |
| 11,565,709 | B1* | 1/2023 | Caldwell | G06N 3/088 |
| 11,851,086 | B2* | 12/2023 | Cohen | G01C 22/00 |
| 11,952,001 | B1* | 4/2024 | Wang | G07C 5/008 |
| 2018/0118219 | A1* | 5/2018 | Hiei | B60W 50/14 |
| 2019/0050520 | A1* | 2/2019 | Alvarez | G06F 30/20 |

(Continued)

FOREIGN PATENT DOCUMENTS

| | | | |
|---|---|---|---|
| JP | 2018077827 | A | 5/2018 |
| KR | 20220138059 | A | 10/2022 |

OTHER PUBLICATIONS

International Search Report and Written Opinion for Application No. PCT/US2023/086410, mailed Apr. 30, 2024. 9 pages.

*Primary Examiner* — David P. Merlino

(74) *Attorney, Agent, or Firm* — Dority & Manning, P.A.

(57) ABSTRACT

An example method includes obtaining log data descriptive of an exemplar action of an exemplar vehicle in an environment, the exemplar action occurring in an initial state of the environment; determining, using the operational system, a planned action for a simulated vehicle in the initial state of the environment; simulating an SUT state of the environment resulting from the simulated vehicle executing the planned action in the initial state of the environment and an actor performing an actor action subsequent to the planned action and an exemplar state of the environment resulting from the simulated vehicle executing the exemplar action in the initial state of the environment and the actor performing the actor action subsequent to the exemplar action; determining a test score based on the SUT state and a reference score based on the exemplar state; evaluating the operational system based on the test score and the reference score.

20 Claims, 13 Drawing Sheets

(56) References Cited

U.S. PATENT DOCUMENTS

| | | | |
|---|---|---|---|
| 2019/0156150 A1* | 5/2019 | Krishnan | G06V 40/18 |
| 2019/0220028 A1* | 7/2019 | Anderson | G06N 5/022 |
| 2020/0050536 A1* | 2/2020 | Nygaard | G06F 11/3684 |
| 2020/0167436 A1 | 5/2020 | Xiao et al. | |
| 2021/0261156 A1* | 8/2021 | Ackenhausen | B60W 60/0011 |
| 2021/0387628 A1 | 12/2021 | Wang et al. | |
| 2021/0403033 A1* | 12/2021 | Cohen | G01C 21/3453 |
| 2022/0266859 A1* | 8/2022 | Semple | G07C 5/0841 |
| 2022/0315052 A1* | 10/2022 | Oboril | B60W 60/00274 |
| 2023/0067822 A1* | 3/2023 | Jiang | B60W 40/09 |

\* cited by examiner

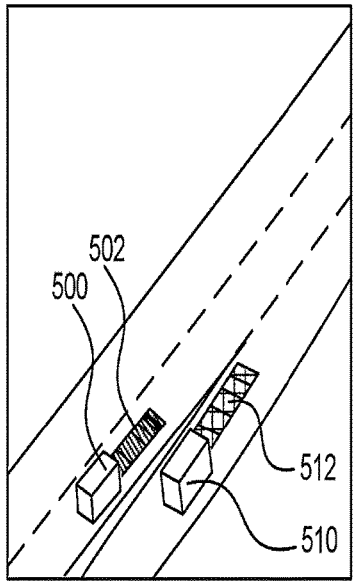 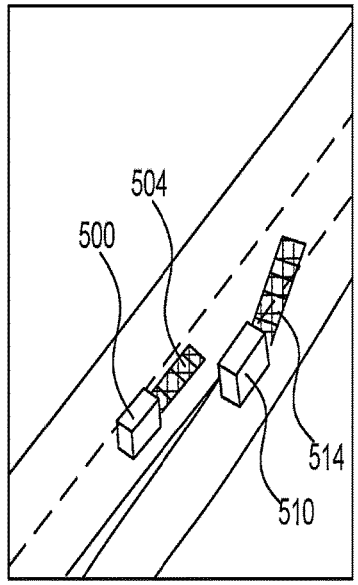 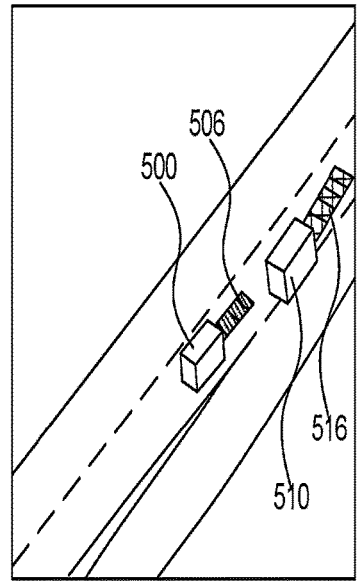
FIG. 5A    FIG. 5B    FIG. 5C
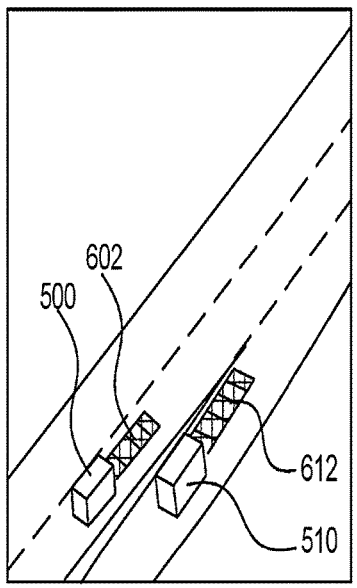 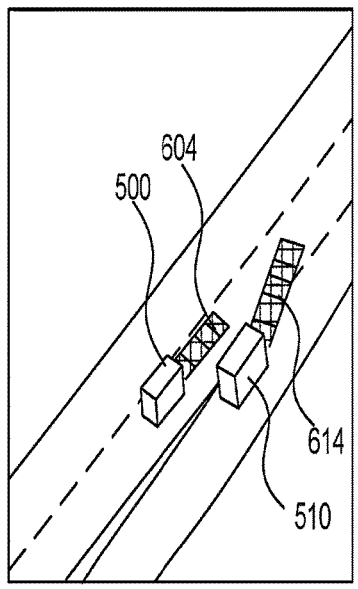 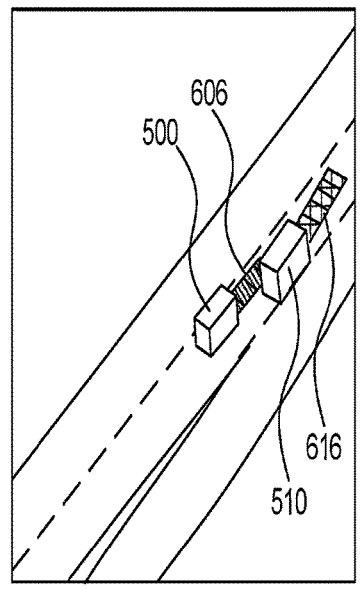
FIG. 6A    FIG. 6B    FIG. 6C

SYSTEMS AND METHODS FOR AUTONOMOUS VEHICLE VALIDATION

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

The present disclosure is directed to techniques for validating systems for operating autonomous vehicles. Validation techniques according to the present disclosure can holistically evaluate an end-to-end autonomy computing pipeline or selected portions thereof. Example implementations can inject a simulated autonomous vehicle into a driving scenario and compare a planned behavior of the autonomous vehicle to the behavior of an exemplar vehicle in the same scenario.

For instance, log data can document the behavior of human exemplars in a variety of driving scenarios. Example implementations can simulate an outcome resulting from the simulated autonomous vehicle executing the planned action and can simulate an outcome resulting from the simulated autonomous vehicle executing the exemplar action. In this manner, outcomes achieved by operational systems of an autonomous vehicle can be validated against baselines provided by human exemplars.

Validation techniques according to the present disclosure can leverage the expertise of human drivers when encountering certain scenarios (e.g., edge case scenarios). For instance, a human driver might cover the brakes or decrease acceleration when driving past a merging zone of a roadway when there are other vehicles merging into the driver's lane, even though the driver generally has the right of way in the lane. The human driver's choice encodes a complex balancing of risk and cost: the risk of a surprise early cut-in by another vehicle, the cost of being unprepared for the surprise early cut-in, and the cost to the driver of slowing down. Accordingly, at scale, the collective behavior of human exemplars can provide a framework for understanding what behavior is expected of vehicles in different driving scenarios. Accordingly, one example technique for evaluating autonomous vehicle behavior (and the operational systems that control the behavior) includes comparison to human exemplars.

In some examples, directly comparing autonomous vehicle behavior to human exemplars includes counting a number of interventions of a human operator supervising an autonomous vehicle. A goal can be to decrease the number of interventions, such that the autonomous vehicle naturally drives in the manner expected and accepted by the human operator.

In some examples, validation techniques according to the present disclosure can determine a proxy of human operator intervention events by comparing the behavior of recorded exemplars (e.g., using log data) in a given driving scenario with planned behavior of an autonomous vehicle injected into the same scenario. By evaluating differences between the behaviors—and potential resulting outcomes—the operational systems of the autonomous vehicle can be evaluated against the baseline.

Advantageously, validation techniques according to the present disclosure can evaluate the performance of operational systems for autonomous vehicles without requiring hand-tuned, hard-coded complex costs and arbitrary thresholds and envelopes. Example implementations can leverage large-scale datasets logging millions of instances of expert decision-making exemplars to evaluate the performance of operational systems for autonomous vehicles without needing to explicitly model the decision-making heuristics.

Validation techniques according to the present disclosure can also advantageously obtain direct comparisons with exemplars without requiring extensive open-ended accumulation of actual or simulated driving miles and corresponding data samples associated with the occurrence of potential scenarios. Such accumulation can consume considerable resources (e.g., computational resources, energy resources, etc.) and be time consuming, even if simulated. Advantageously, by injecting simulated autonomous vehicles into scenarios derived from existing log data, direct comparisons with exemplar behavior can be obtained with much greater density.

Validation techniques according to the present disclosure can also advantageously facilitate holistic evaluation of the effect of individual model development on overall outcomes achieved by the autonomous vehicle. For instance, autonomy computing pipelines can implement a number of complex systems and models to perceive and understand an environment and generate and execute plans for traversing the environment. By evaluating performance holistically against an exemplar baseline, changes to individual operational systems and systems can be evaluated based on the effects on overall performance of the vehicle. In this manner, performance differences that cause deviations from exemplar behavior can be prioritized for development over performance differences that do not ultimately contribute to performance defects. Accordingly, validation techniques according to the present disclosure can assist in more efficient and effective system and model development.

For example, in an aspect, the present disclosure provides an example method for validating an operational system for operating an autonomous vehicle. In some implementations, the example method includes (a) obtaining log data descriptive of an exemplar action of an exemplar vehicle in an environment, the exemplar action occurring in an initial state of the environment. In some implementations, the example method includes (b) determining, using the operational system, a planned action for a simulated vehicle in the initial state of the environment. In some implementations, the example method includes (c) simulating (i) an SUT state of the environment resulting from the simulated vehicle executing the planned action in the initial state of the environment and an actor performing an actor action subsequent to the simulated vehicle executing the planned action and (ii) an exemplar state of the environment resulting from the simulated vehicle executing the exemplar action in the initial state of the environment and the actor performing the actor action subsequent to the simulated vehicle executing the exemplar action. In some implementations, the example method includes (d) determining a test score based on the SUT state of the environment and a reference score based on the exemplar state of the environment. In some implementations, the example method includes (e) evaluating the operational system based on the test score and the reference score.

In some implementations of the example method, the actor action includes a hazard affecting the simulated vehicle. In some implementations of the example method, the exemplar action is a guarding driving behavior to guard against occurrence of the hazard.

In some implementations of the example method, the actor action is selected from a plurality of actions having a probability below a threshold probability.

In some implementations of the example method, (c) includes determining a reaction to the hazard affecting the simulated vehicle.

In some implementations of the example method, the exemplar action includes a vehicle state of a human-driven vehicle.

In some implementations of the example method, the operational system includes at least one model of an autonomous vehicle control system configured to receive sensor data and control movement of an autonomous vehicle. In some implementations of the example method, the operational system includes a motion planning model. In some implementations of the example method, the operational system includes a perception model.

In some implementations of the example method, the exemplar action is a guarding driving behavior.

In some implementations of the example method, (c) (e.g., simulating the first and exemplar states) includes simulating an action for an actor in the environment subsequent to the simulated vehicle executing the planned action and the exemplar action. In some implementations of the example method, the action is selected from a plurality of actions having a probability below a threshold probability. In some implementations of the example method, the action for the actor includes a hazard affecting the simulated vehicle.

In some implementations of the example method, (c) (e.g., simulating the first and exemplar states) includes simulating a reaction to the hazard affecting the simulated vehicle.

In some implementations of the example method, the test score is based on a state of the simulated vehicle in the SUT state of the environment and the reference score is based on a state of the simulated vehicle in the exemplar state of the environment.

In some implementations of the example method, (d) (e.g., determining a test score) includes evaluating the state of the simulated vehicle in the SUT state of the environment and the state of the simulated vehicle in the exemplar state of the environment with a cost function. In some implementations of the example method, the cost function is determined based on a distance to an actor boundary. In some implementations of the example method, the cost function is determined based on a severity measure of an intersection with an actor boundary.

In some implementations of the example method, (e) (e.g., evaluating the operational system) includes categorizing, based on one or more features of the initial state of the environment, the test score and the reference score.

In some implementations of the example method, the example method includes (f) determining one or more categories for improvement associated with suboptimal test scores; and (g) adjusting one or more parameters of the operational system corresponding to operation of the autonomous vehicle in the one or more categories for improvement.

For example, in an aspect, the present disclosure provides for one or more example non-transitory computer-readable media storing instructions that are executable to cause one or more processors to perform operations. In some implementations, the operations include (a) obtaining log data descriptive of an exemplar action of an exemplar vehicle in an environment, the exemplar action occurring in an initial state of the environment. In some implementations, the operations include (b) determining, using the operational system, a planned action for a simulated vehicle in the initial state of the environment. In some implementations, the operations include (c) simulating (i) an SUT state of the environment resulting from the simulated vehicle executing the planned action in the initial state of the environment and an actor performing an actor action subsequent to the simulated vehicle executing the planned action and (ii) an exemplar state of the environment resulting from the simulated vehicle executing the exemplar action in the initial state of the environment and the actor performing the actor action subsequent to the simulated vehicle executing the exemplar action. In some implementations, the operations include (d) determining a test score based on the SUT state of the environment and a reference score based on the exemplar state of the environment. In some implementations, the operations include (e) evaluating the operational system based on the test score and the reference score.

In some implementations of the example one or more non-transitory computer-readable media, the actor action includes a hazard affecting the simulated vehicle. In some implementations of the example one or more non-transitory computer-readable media, the exemplar action is a guarding driving behavior to guard against occurrence of the hazard.

In some implementations of the example one or more non-transitory computer-readable media, the actor action is selected from a plurality of actions having a probability below a threshold probability.

In some implementations of the example one or more non-transitory computer-readable media, (c) includes determining a reaction to the hazard affecting the simulated vehicle.

In some implementations of the example one or more non-transitory computer-readable media, the exemplar action includes a vehicle state of a human-driven vehicle.

In some implementations of the example one or more non-transitory computer-readable media, the exemplar action is a guarding driving behavior.

In some implementations of the example one or more non-transitory computer-readable media, (c) (e.g., simulating the first and exemplar states) includes simulating an action for an actor in the environment subsequent to the simulated vehicle executing the planned action and the exemplar action.

For example, in an aspect, the present disclosure provides an example autonomous vehicle control system for controlling an autonomous vehicle. In some implementations, the example autonomous vehicle control system includes one or more processors and one or more non-transitory computer-readable media storing instructions that are executable by the one or more processors to cause the autonomous vehicle control system to control a motion of the autonomous vehicle using an operational system. In some implementations, the operational system was validated by (a) obtaining log data descriptive of an exemplar action of an exemplar vehicle in an environment, the exemplar action occurring in an initial state of the environment. In some implementations, the operational system was validated by (b) determining, using the operational system, a planned action for a simulated vehicle in the initial state of the environment. In some implementations, the operational system was validated by (c) simulating (i) an SUT state of the environment resulting from the simulated vehicle executing the planned action in the initial state of the environment and an actor performing an actor action subsequent to the simulated vehicle executing the planned action and (ii) an exemplar state of the environment resulting from the simulated vehicle executing the exemplar action in the initial state of the environment and the actor performing the actor action subsequent to the simulated vehicle executing the exemplar action. In some implementations, the operational system was validated by (d) determining a test score based on the SUT state of the environment and a reference score based on the exemplar state of the environment. In some implementations, the operational system was validated by (e) evaluating the operational system based on the test score and the reference score.

Other example aspects of the present disclosure are directed to other systems, methods, vehicles, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which:

FIG. 5A is a diagram of an example validation scenario, according to some implementations of the present disclosure;

FIG. 5B is a diagram of an example validation scenario, according to some implementations of the present disclosure;

FIG. 5C is a diagram of an example validation scenario, according to some implementations of the present disclosure;

FIG. 6A is a diagram of an example validation scenario, according to some implementations of the present disclosure;

FIG. 6B is a diagram of an example validation scenario, according to some implementations of the present disclosure;

FIG. 6C is a diagram of an example validation scenario, according to some implementations of the present disclosure;

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems.

Figure 1:
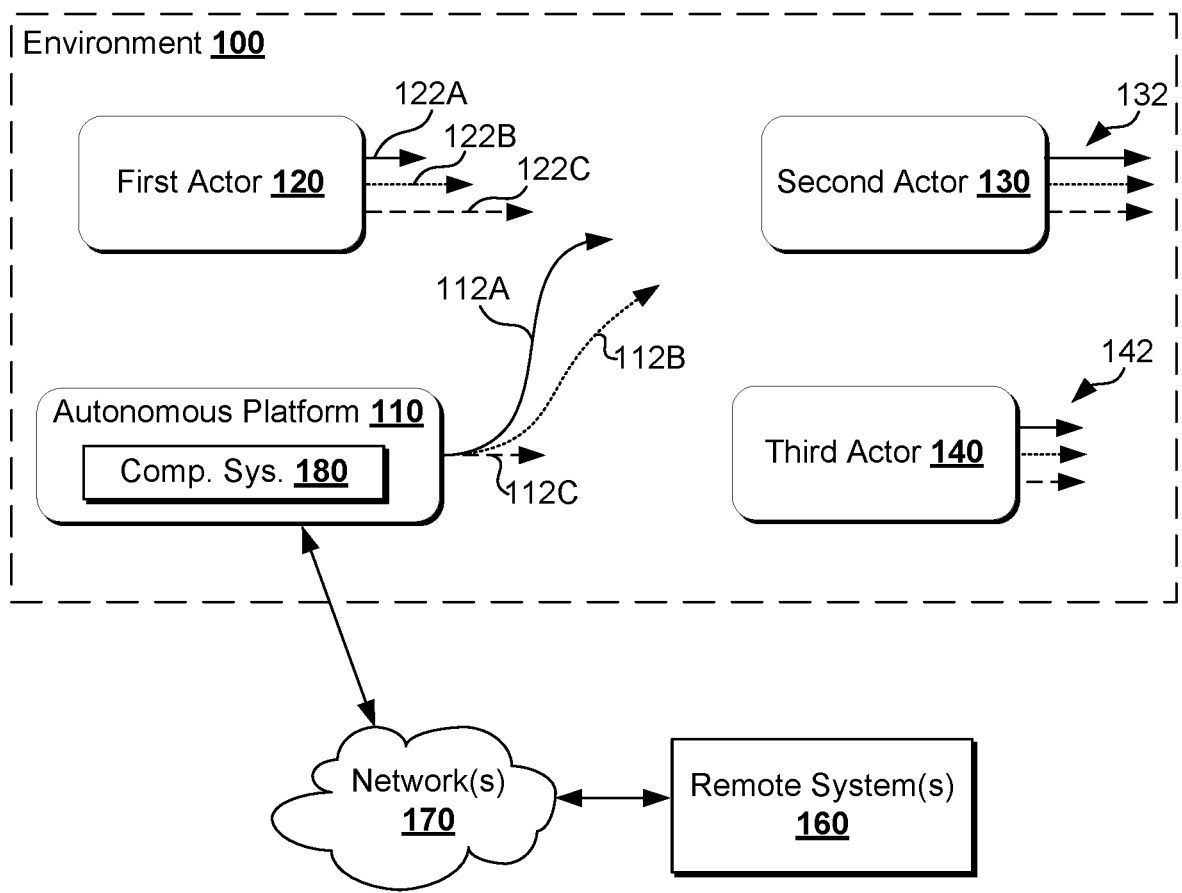
FIG. 1 is a block diagram of an example operational scenario, according to some implementations of the present disclosure.

With reference to FIGS. 1-14, example implementations of the present disclosure are discussed in further detail. FIG. 1 is a block diagram of an example operational scenario, according to some implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 may be any type of platform configured to operate within the environment 100. For example, the autonomous platform 110 may be a vehicle configured to autonomously perceive and operate within the environment 100. The vehicles may be a ground-based autonomous vehicle such as, for example, an autonomous car, truck, van, etc. The autonomous platform 110 may be an autonomous vehicle that can control, be connected to, or be otherwise associated with implements, attachments, and/or accessories for transporting people or cargo. This can include, for example, an autonomous tractor optionally coupled to a cargo trailer. Additionally or alternatively, the autonomous platform 110 may be any other type of vehicle such as one or more aerial vehicles, water-based vehicles, space-based vehicles, other ground-based vehicles, etc.

The autonomous platform 110 may be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, the environment 100 can include one or more objects. The object(s) may be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s).

Figure 2:
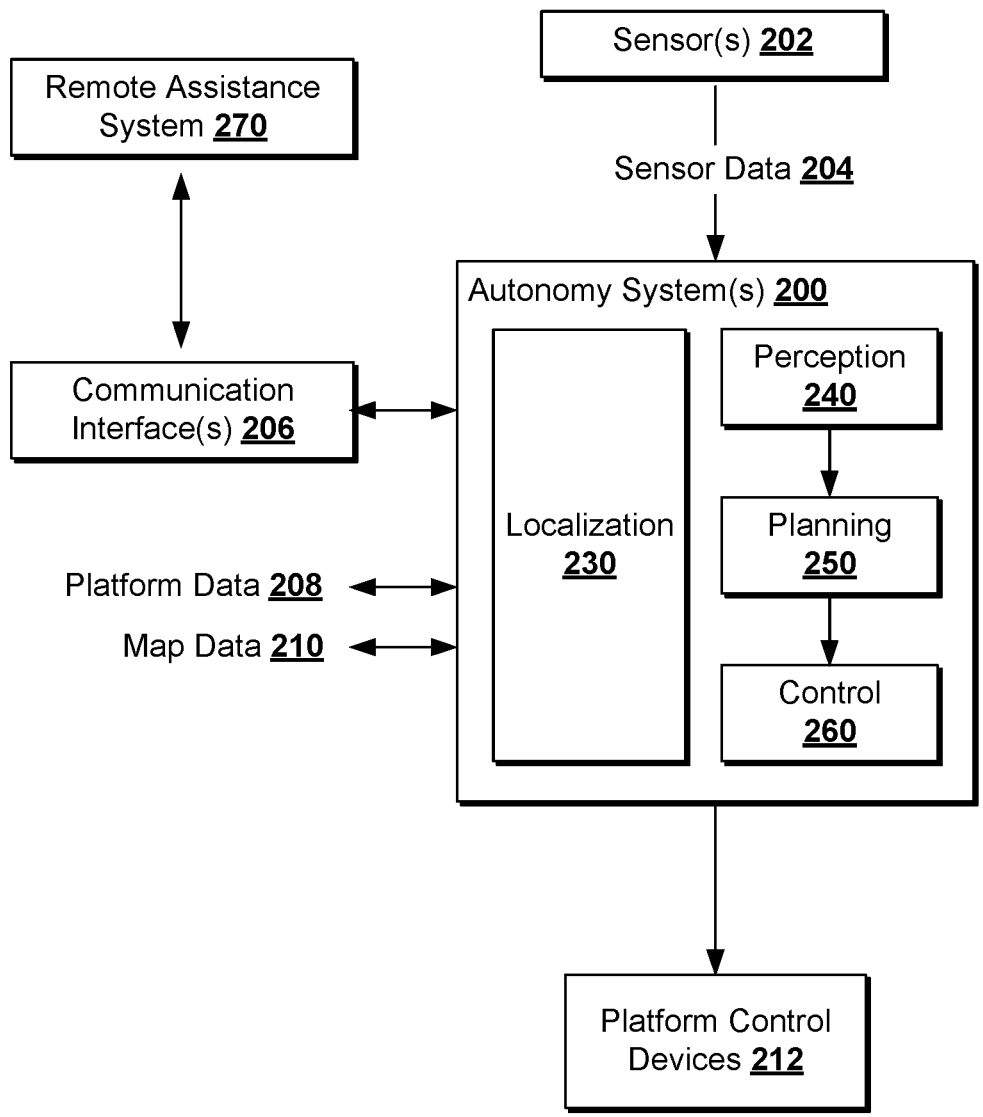
FIG. 2 is a block diagram of an example system, according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 may include different subsystems for performing various autonomy operations. The subsystems may include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

The autonomy system 200 can be located onboard (e.g., on or within) an autonomous platform and can be configured to operate the autonomous platform in various environments. The environment may be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally or alternatively, the map data 210 can include sparse map data (e.g., lane graphs, etc.). In some implementations, the sensor data 204 can be fused with or used to update the map data 210 in real-time.

The autonomy system 200 can include the localization system 230, which can provide an autonomous platform with an understanding of its location and orientation in an environment. In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned models. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, the control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger may be an alert, an error signal, a map feature, a request, a location, a traffic condition, a road condition, etc.

After initiating the session, the autonomy system 200 can provide context data to the remote assistance system 270. The context data may include sensor data 204 and state data of the autonomous platform. For example, the context data may include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

The autonomy system 200 can use the assistive signal(s) for input into one or more autonomy subsystems for performing autonomy functions. For instance, the planning subsystem 250 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning subsystem 250. Additionally or alternatively, assistive signal(s) can be considered by the autonomy system 200 as suggestive inputs for consideration in addition to other received data (e.g., sensor inputs, etc.).

The autonomy system 200 may be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
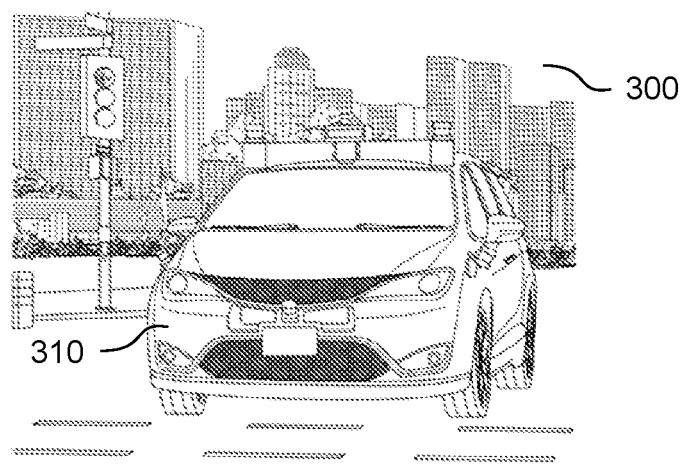
FIG. 3A is a representation of an example operational environment, according to some implementations of the present disclosure.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
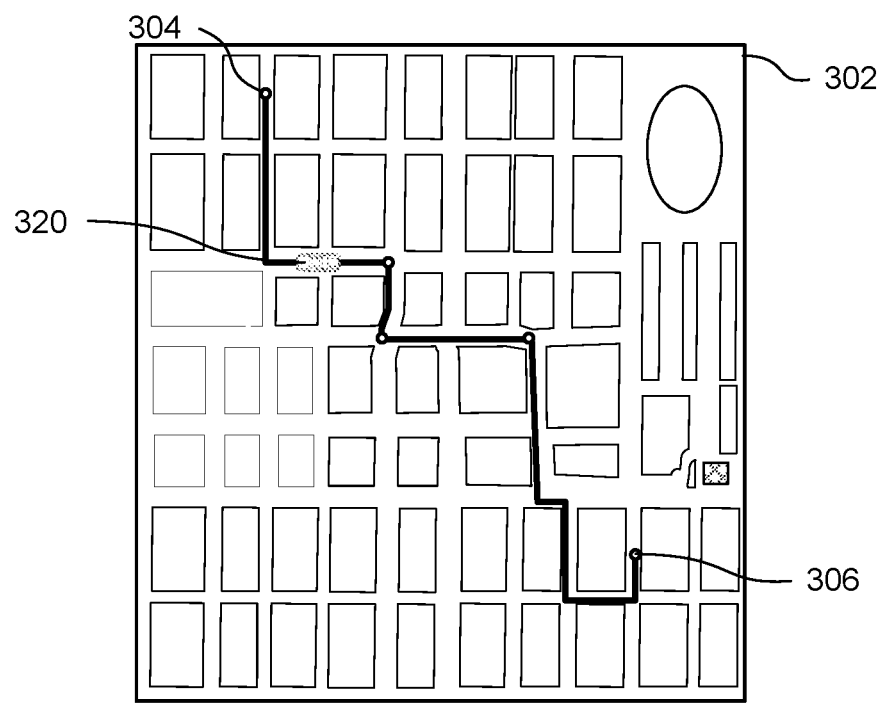
FIG. 3B is a representation of an example map of an operational environment, according to some implementations of the present disclosure.

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
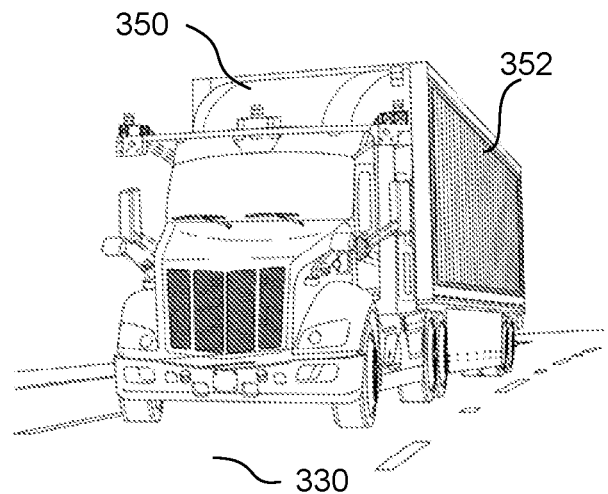
FIG. 3C is a representation of an example operational environment, according to some implementations of the present disclosure.

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
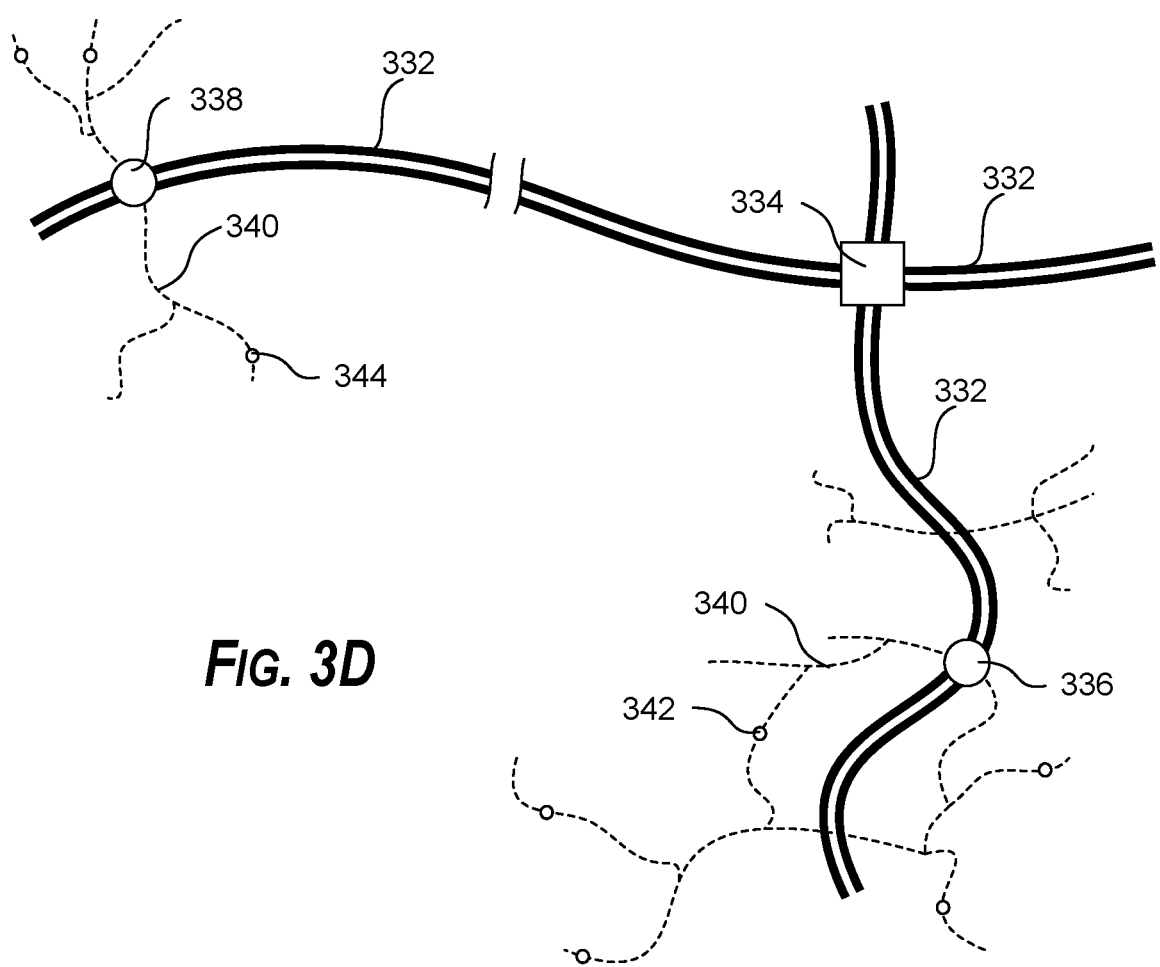
FIG. 3D is a representation of an example map of an operational environment, according to some implementations of the present disclosure.

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to the transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338, and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To improve the performance of an autonomous platform, such as an autonomous vehicle controlled at least in part using autonomy system 200 (e.g., the autonomous vehicles 310 or 350), the planning system 250 can implement validation techniques according to example aspects of the present disclosure.

Figure 4:
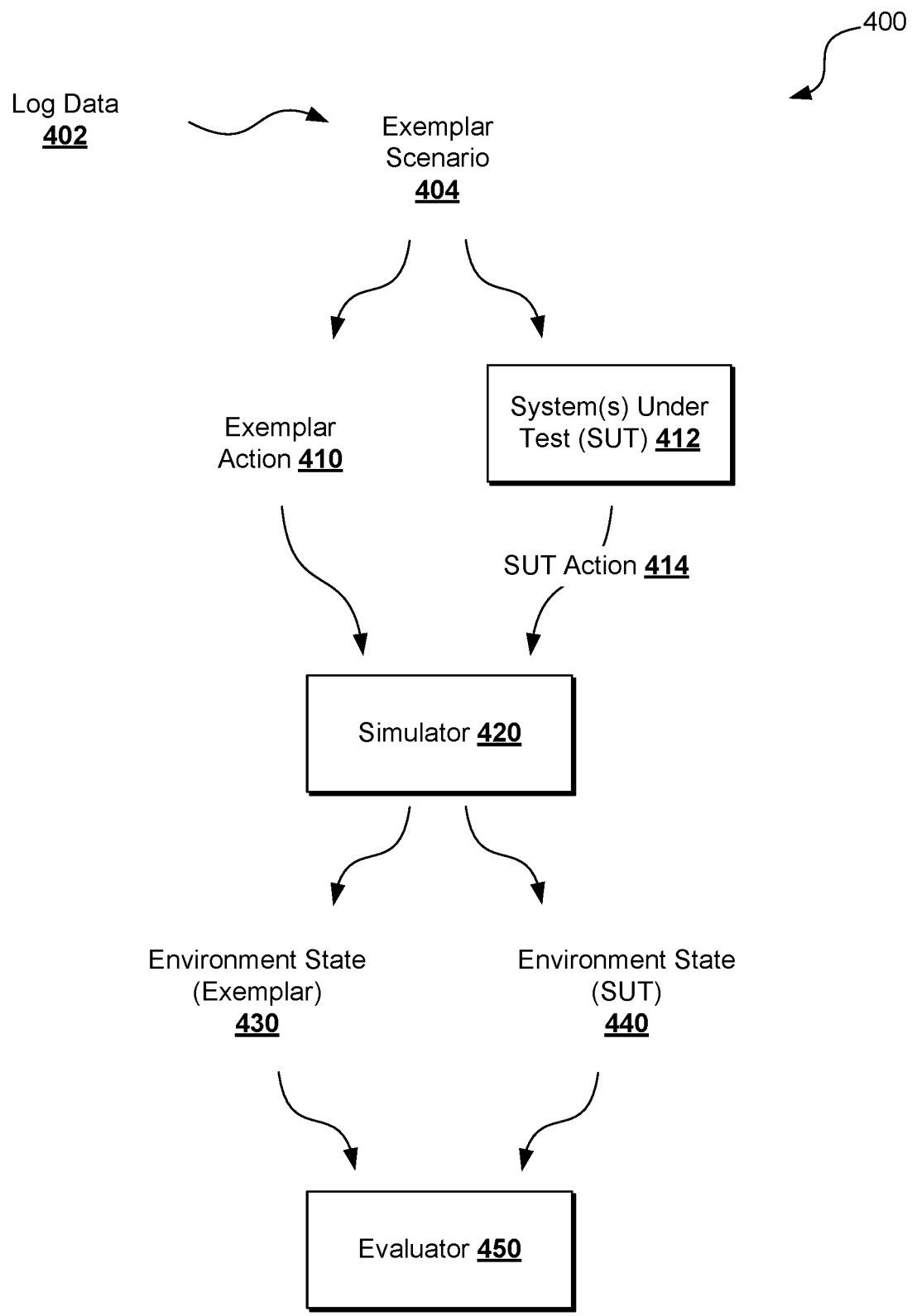
FIG. 4 is a block diagram of an example system for performing system validation, according to some implementations of the present disclosure.

FIG. 4 is a block diagram of a validation system 400, according to some implementations of the present disclosure. Although FIG. 4 illustrates an example implementation of a validation system 400 having various components, it is to be understood that the components can be rearranged, combined, omitted, etc. within the scope of and consistent with the present disclosure.

The validation system 400 can take as input log data 402. Log data 402 can include data recorded during instances of real-world or simulated driving. The recorded data can include data collected by sensors onboard one or more vehicles (e.g., autonomous vehicles, non-autonomous vehicles, etc.). The recorded data can include data collected from other sources (e.g., roadside cameras, aerial vehicles, etc.). Log data 402 from simulated scenarios can include probabilistic data, such as data sampled from a distribution fitted to a number of observations.

The validation system 400 can extract an exemplar scenario 404 from the log data. The exemplar scenario 404 can be a portion of the log data 402 that describes a scene or event of interest that includes an exemplar. The scene or event of interest can include an environment, including objects, actors, etc. The exemplar can be an object or actor that is a subject of study during the validation. The exemplar can be an actor that demonstrates behavior against which another system can be validated. The exemplar scenario 404 can include a driving scenario. The exemplar scenario 404 can be selected based on the possibility of exploring edge case eventualities and a system's responses thereto. For example, an exemplar scenario 404 can include an exemplar vehicle driving past a vehicle parked on the side of the street, an exemplar vehicle merging into traffic, an exemplar vehicle maintaining a trailing distance at a steady state cruise on a highway, etc.

In the exemplar scenario 404, the exemplar can perform an exemplar action 410. For instance, in a scenario including an exemplar vehicle passing a street-parked vehicle, the exemplar action 410 could include an amount of deceleration (or decrease in acceleration) of the exemplar vehicle as the exemplar vehicle approaches the street-parked vehicle. In another example, in a scenario including an exemplar vehicle maintaining a steady-state cruise on a highway, the exemplar action 410 could include an amount of distance maintained behind a leading vehicle. In another example, in a scenario including an exemplar vehicle merging (or in a lane being merged into), the exemplar action 410 could include an amount of acceleration or deceleration applied in response to the merge. The exemplar action 410 can be a guarding maneuver undertaken to reduce a likelihood of a severe event or to reduce a severity of a severe event. For instance, the exemplar action 410 can be a defensive driving maneuver.

The validation system 400 can validate a system under test (SUT) 412 by injecting a simulated vehicle into the exemplar scenario 404 for comparison against the exemplar. For example, given the context of the exemplar scenario 404, the SUT action 414 can represent the action a subject vehicle implementing the SUT 412 would execute in the same circumstances that led the exemplar to execute the exemplar action 410 (e.g., "teleporting" the SUT 412 to the exact moment in the log data at which the exemplar acts, or an interpolation thereof). In this manner, for example, the SUT action 414—and the outcomes that follow—can be compared against the exemplar action 410 and the resultant outcomes.

The SUT 412 can be or include one or more operational systems of an autonomous vehicle. For instance, the SUT 412 can include one or more autonomy systems or one or more systems operating in support of an autonomy system. For instance, SUT 412 can include one or more portions of autonomy system 200, such as a localization subsystem 230, a perception subsystem 240, a planning subsystem 250, a control subsystem 260, etc. In some examples, SUT 412 can include sensor(s) 202, communication interface(s) 206, remote assistance system 270, platform control devices 212, etc. The SUT 412 can include one or more machine-learned models.

The validation system 400 can evaluate changes to any part of an autonomous vehicle control system pipeline. Advantageously, the validation system 400 can facilitate evaluation in a common reference frame-comparison to the exemplar(s). In this manner, for example, the task of evaluating changes to complex systems can be reduced to evaluating whether or not the SUT 412, as a whole, effectively behaves better or worse than an exemplar. For instance, a velocity error of a sensor 202 at 200 meter range may have a greater magnitude than a velocity error of the sensor 202 at 1 meter range, but the validation system 400 can help evaluate if the end effect on the overall performance of the SUT 412 actually results in materially different behavior as compared to the exemplars. Similarly, the validation system 400 can help evaluate if different machine-learned model architectures complex machine-learned perception models materially affect overall system behavior as compared to the exemplars.

The exemplar action 410 and the SUT action 414 can include current or future state data descriptive of a vehicle state for the subject vehicle. For instance, the vehicle state can include position, velocity, acceleration, jerk, orientation, heading, etc.

In some implementations, the validation system 400 can compare exemplar action 410 directly to the SUT action 414. For instance, the validation system 400 can score exemplar action 410 and score SUT action 414 based on various costs or heuristics, such that the scores can be compared. For instance, the SUT action 414 can include a motion plan for a simulated subject vehicle, and the planned motion can be compared to an exemplar motion taken by the exemplar.

Additionally, or alternatively, the validation system 400 can use simulator 420 to let the exemplar scenario 404 play out over time using both the exemplar action 410 and the SUT action 414 as different starting points or seed actions. For instance, the simulator 420 can simulate (e.g., up to a given time horizon, such as 1 s, 5 s, etc.) what events will likely occur in the environment if a subject vehicle takes the exemplar action 410. At various points in time, the simulator 420 can output an environmental state 430 associated with the exemplar action 410. The environmental state 430 can include state data associated with object states and actor states for objects and actors in the environment over time.

Similarly, the simulator 420 can also simulate what events will likely occur in the environment if the subject vehicle takes the SUT action 414. At various points in time, the simulator 420 can output an environmental state 440 associated with the SUT action 414. The environmental state 440 can include state data associated with object states and actor states for objects and actors in the environment over time.

The simulator 420 can include multiple types or layers of simulation. For instance, simulator 420 can be configured to environment data (e.g., initial state data descriptive of the environment) and output a planned SUT action. The simulator 420 can simulate the operations of the system(s) under test (e.g., one or more components of an autonomous vehicle computing system) in a simulated environment. For instance, the simulator 420 can input simulated sensor data into the simulated autonomous vehicle control system(s) to obtain simulated control decisions.

The simulator 420 can also be configured to perform more lightweight simulations. For instance, the simulator 420 can compute simulations based on approximations. For instance, the simulator 420 can compute simulations to obtain conservative estimates of stopping distance, deceleration speed, lane change speed, etc. For instance, the simulator 420 can compute simulations to efficiently estimate an outer bound of a reaction to the actor action (e.g., an upper bound of stopping time or distance). For instance, the simulator 420 can compute simulations using simplified analytical expressions modeling the subject vehicle motion (e.g., motion of a vehicle controlled using the SUT). For instance, the subject vehicle motion can be modeled as a projectile trajectory in one, two, or three dimensions. In this manner, for instance, the simulator 420 can estimate the SUT state 440 and exemplar state 430 in a cost-efficient manner. The simulator 420 can compute the SUT states and exemplar states for multiple actor actions. For instance, for a given stage of an outer loop simulation (e.g., a simulation of a subject vehicle driving in an environment at a given point in time), the simulator 420 can iteratively execute a lighter-weight inner loop simulation to compute the capability of the subject vehicle to respond to a range of various hazards in the environment.

An evaluator 450 can evaluate and optionally compare the environmental states 430 and 440. In some implementations, the evaluator 450 outputs only a relative assessment of the SUT 412 as compared to the exemplars. In some implementations, the evaluator 450 additionally, or alternatively, generates an evaluation of the environmental states 430 and 440 across the corpus of log data 402.

An example validation scenario is illustrated in FIGS. 5A-6C. For example, in FIG. 5A, a simulated subject vehicle 500 can be simulated as traveling in a lane of a roadway with an action 502 for execution. For instance, the action 502 can be an exemplar action 410 drawn from log data 402. In FIG. 5A, the action 502 can include a coasting action in view of the actor 510 approaching a merging area of the roadway with a projected actor action 512 (e.g., an expected action based on the current state of the actor 510, etc.). The action 502 can represent a defensive driving or guarding behavior that an expert human driver would take in the scenario.

In FIG. 5B, at a time after the snapshot seen in FIG. 5A, the simulated subject vehicle 500 and the actor 510 have both advanced along the roadway. For instance, this advance could result from simulation by the simulator 420. At this later time, a hazard can be simulated. For example, the validation system 400 can simulate actor 510 performing an actor action 514. The actor action 514 can be a hard cut-in.

In FIG. 5C, at a time after the snapshot seen in FIG. 5B, the simulated subject vehicle 500 and the actor 510 have both advanced further along the roadway. For instance, this advance could result from simulation by the simulator 420. At this later time, the subject 500 can perform a prescribed action 506 in response to the actor action 514 or the actor action 516. For instance, the prescribed action 506 can include moderate braking in response to the rapid merging of the actor 510.

The state of the environment depicted in FIGS. 5A-5C can be environmental states output by a simulator 420. For example, the state of the environment in FIG. 5A can be an initial state of the environment. If the action 502 is the exemplar action 410, then the later resulting state in FIG. 5C can be the environmental state 430. The environmental state can include, for instance, the distance between subject vehicle 500 and actor 510, data descriptive of the braking action 506, such as the velocity, acceleration, jerk, etc. associated with execution of the braking action 506, and the like.

FIGS. 6A-6C illustrate an alternative scenario in which the simulated subject vehicle 500 takes an initial action 602 instead of action 502. The action 602 can be an SUT action 414 output by a system under test 412 in response to one or more inputs descriptive of the environment of FIG. 6A (e.g., an action determined by a motion planner of an autonomous vehicle control system). The action 602 can differ from the action 502. For example, the action 602 can be associated with a different velocity or acceleration than the action 502.

In FIG. 6B, at a time after the snapshot seen in FIG. 6A, the simulated subject vehicle 500 and the actor 510 have both advanced along the roadway. For instance, this advance could result from simulation by the simulator 420. At this later time, the same hazard that was simulated in FIG. 5B can be simulated here. For example, the validation system 400 can simulate actor 510 performing an actor action 614. The actor action 614 can be a hard cut-in like the actor action 514.

In FIG. 6C, at a time after the snapshot seen in FIG. 6B, the simulated subject vehicle 500 and the actor 510 have both advanced further along the roadway. For instance, this advance could result from simulation by the simulator 420. At this later time, the subject 500 can perform a prescribed action 606 in response to the actor action 614 or the actor action 616. For instance, the prescribed action 606 can include hard braking in response to the rapid merging of the actor 510. The prescribed action 606 may be the same as the prescribed action 506.

The states of the environment depicted in FIGS. 6A-6C can be environmental states output by a simulator 420. For example, the state of the environment in FIG. 6A can be an initial state of the environment. If the action 602 is the SUT action 414, then the resulting state in FIG. 6C can be the environmental state 440. The environmental state can include, for instance, the distance between subject vehicle 500 and actor 510, data descriptive of the braking action 606, such as the velocity, acceleration, jerk, etc. associated with execution of the braking action 606, and the like. The validation system 400 can directly compare the resulting environmental state in FIG. 5C to the resulting environmental state in FIG. 6C to determine whether the action 602 resulted in a comparable outcome to the action 502. In this way, the validation system 400 can directly measure an exemplar (e.g., an expert human driver) against an SUT (e.g., an autonomous vehicle control system).

In some implementations, the simulations seeded by the exemplar action 410 and the SUT action 414 can cover a range of time scales. For instance, in some implementations, the time scale of simulation can roll out over periods of time sufficient to capture interactions between the subject vehicle and its environment. In some implementations, the time scale of simulation can be relatively short, such as within the planning horizon of a motion planner of the SUT 412. For instance, in some implementations, the simulator 420 obtains a simulated outcome directly based on the motion plan output by the SUT 412 itself.

In this manner, for instance, the validation system 400 can provide for paired comparison of the exemplar(s) and the SUT 412. The precision of pairing can be configurable: for instance, the pairing can be based at the scenario-level (e.g., compare what the exemplar does in a given scenario with what the SUT proposes in a given scenario) or at the timestamp-level (e.g., compare the potential outcomes resulting from the exemplar's action 410 at a given moment with the potential outcomes resulting from the SUT action 414 at the same moment).

Accordingly, the validation system 400 can score the environmental states of FIG. 5C and FIG. 6C to evaluate how well the SUT 412 performed in comparison to the exemplar. In general, the state outcomes can be scored according to any desired metrics or heuristics. For instance, a score can represent a severity of an outcome. A severity can relate to a potential intersection of the subject vehicle 500 and a boundary (e.g., bounding box, border, etc.) of an object or actor. For instance, a severity can include the occurrence of the intersection, a distance from intersection (e.g., a margin or buffer, etc.), a rate of contact or intersection, an amount of overlap, etc. In some implementations, the severity can include energy-based evaluation techniques (e.g., based on kinetic energy, etc.). A severity can also be based on intrinsic features of the subject vehicle's own motion, such as acceleration, jerk, curvature, etc.

A score or severity value can include temporal features. For instance, if a simulated set of actions play out over a time interval, the score can be computed at each time step of the interval, at time steps sampled from the interval, at the end of the interval, etc. In some implementations, the value can be averaged or otherwise combined over the interval.

A score or severity value can include features based on the context of the given scenario. For instance, some merge scenarios are expected to involve brief periods of close following distance that are often followed by longer periods of a greater following distance. A computation of a score can use the temporal context (e.g., at the beginning of a merge interval) to ensure that an overly close but brief merge maneuver is not underscored because a larger number of later timestamps have a low severity due to a longer following distance. For instance, context can be used to weight different timestamps or different aspects of a cost or score differently.

Similarly, the score or severity can include other context features. For instance, the status of right-of-way, progress in merge, etc. can optionally influence the severity of a given metric, such as a distance determination.

In this manner, for example, the validation system 400 can holistically evaluate the actions proposed by a system under test. For instance, the validation system 400 can compare not only of the immediate actions taken by an exemplar (e.g., exemplar action 410) and the instantaneously corresponding SUT action 414 taken by an SUT 412 in the same situation, but also the downstream outcomes resulting from the different actions.

Figure 7A:
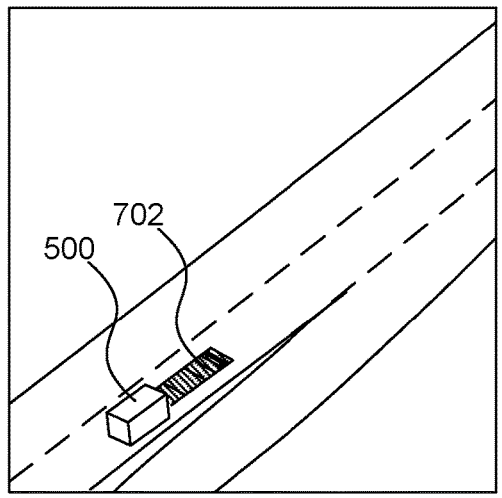
FIG. 7A is a diagram of an example validation scenario, according to some implementations of the present disclosure.
Figure 7B:
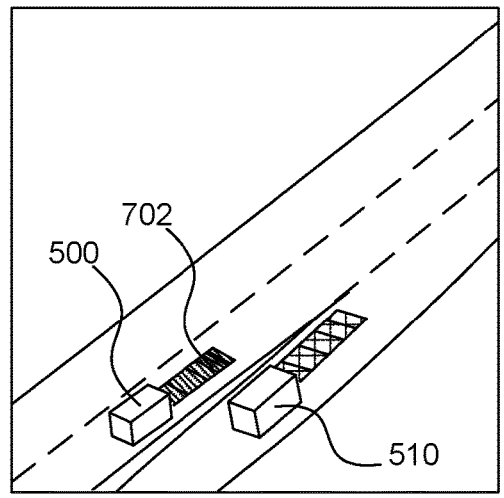
FIG. 7B is a diagram of an example validation scenario, according to some implementations of the present disclosure.
Figure 8A:
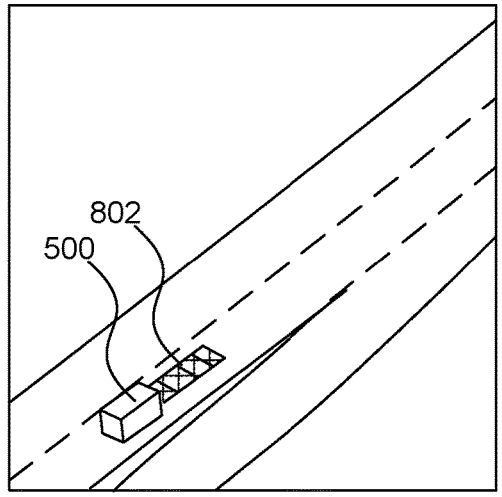
FIG. 8A is a diagram of an example validation scenario, according to some implementations of the present disclosure.
Figure 8B:
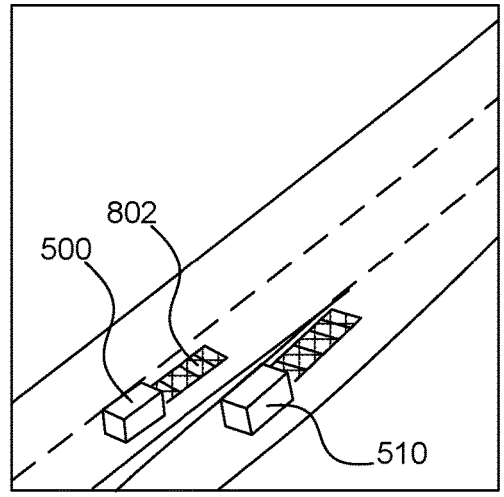
FIG. 8B is a diagram of an example validation scenario, according to some implementations of the present disclosure.

Of particular advantage, this holistic evaluation can facilitate improved validation by focusing the evaluation on the deviations of the SUT 412 that are more important. For example, FIGS. 7A and 8A depict two scenarios in which an exemplar action 702 deviates from an SUT action 802. However, the deviation is of relatively little consequence as compared to the deviations depicted in FIGS. 7B and 8B. In FIGS. 7B and 8B, the presence of the actor 510 increases the possibility of negative outcomes flowing from the deviation of the SUT action 802 from the exemplar action 702 (e.g., as illustrated in FIGS. 5A-6C). In contrast, without the merging of actor 510 in FIGS. 7A and 8A, there is thus no opportunity to encounter the same hard braking event that occurred in FIG. 6C.

Another example includes a scenario in which an actor 510 is changing lanes at a distance ahead of the subject vehicle 500. If the actor 510 is sufficiently far from the subject vehicle 500 and accelerating away from the subject vehicle 500, then a deviation between an exemplar action 702 and an SUT action 802 for the subject vehicle (e.g., whether or not to apply braking force) may not be associated with any meaningful difference in the desirability of a resulting state of the environment. In contrast, if the actor 510 is sufficiently near to the subject vehicle 500, or the distance between the actor 510 and the subject vehicle 500 is closing, then a deviation between an exemplar action 702 and an SUT action 802 for the subject vehicle (e.g., whether or not to apply braking force) may be associated with a meaningful difference in the desirability of a resulting state of the environment.

In this manner, for example, by scoring the simulated outcomes of deviations from exemplar(s), the validation system 400 can effectively decrease the impact of deviations that do not lead to negative outcomes and increase the impact of deviations that are more likely to lead to negative outcomes. In this manner, the validation system 400 can help prioritize validation efforts and SUT improvements to improve performance more efficiently.

In some implementations, the simulator 420 can simulate additional actor actions to evaluate how well the simulated subject vehicle can respond when starting from different initial states or seed states. For instance, the validation system 400 can simulate the subject vehicle's reaction to different actor actions when starting from the exemplar action 410 as compared to when starting from the SUT action 414.

Figure 9A:
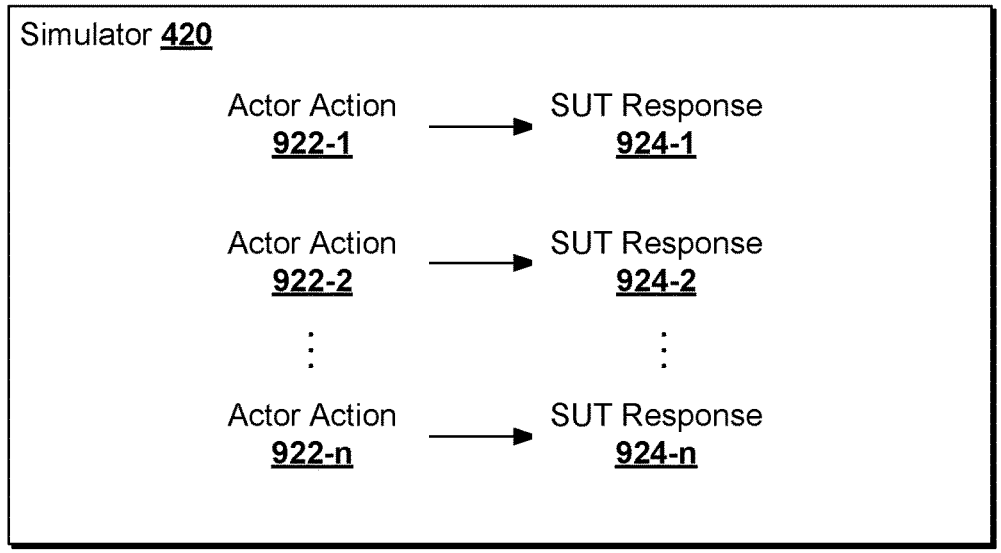
FIG. 9A is a block diagram of an example system for performing system validation, according to some implementations of the present disclosure.
Figure 9B:
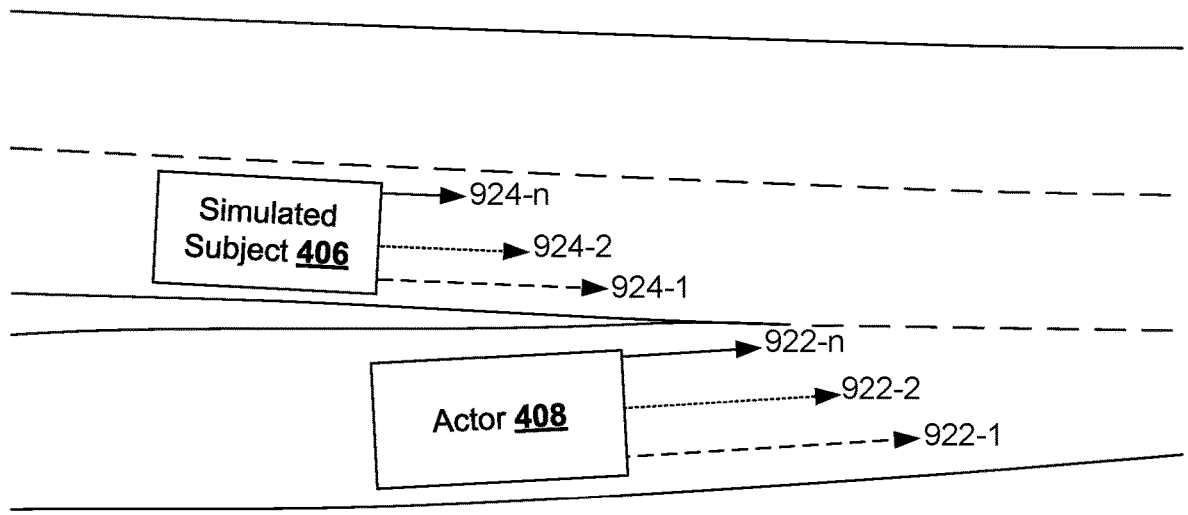
FIG. 9B is a diagram of an example validation scenario, according to some implementations of the present disclosure.

FIGS. 9A and 9B illustrate the simulation action-response pairings. For instance, a simulator 420 can inject an actor action 922-1 into a scenario and simulate the SUT response 924-1. Similarly, the simulator 420 can inject an actor action 922-2 into a scenario and simulate the SUT response 924-2. Similarly, the simulator 420 can inject an actor action 922-*n* into a scenario and simulate the SUT response 924-*n*.

The simulator 420 can simulate each of responses 924-1, 924-2, and 924-*n* starting from each of the exemplar action 410 seed states and the SUT action 414 seed state. And the simulator 420 can obtain resulting environmental states for each of the responses 924-1, 924-2, and 924-*n* and the evaluator 450 can score the states (e.g., similarly to as discussed above with respect to FIGS. 5A-6C). In this manner, for example, the validation system 400 can evaluate how well prepared or guarded the SUT 412 is to respond to the injected actions 922-1, 922-2, 922-*n*, etc. and avoid outcomes that are any worse than the exemplar.

For example, with reference to FIGS. 5B and 6B, actor actions 514 and 614 can be injected actions. Because of different seed states (e.g., an exemplar action 410 leading to FIG. 5B; an SUT action 414 leading to FIG. 6B, etc.), the subject vehicle 500 encounters the injected actions differently. For instance, because action 502 includes a coasting event guarding against the upcoming merge, the subject vehicle 500 encounters the injected actor action 514 with much greater distance behind the actor 510. In contrast, because action 602 did not include a coasting event guarding against the merge, the subject vehicle 500 encounters the injected event 614 with little distance behind the actor 510. Accordingly, the outcomes diverge: the action 506 (e.g., a response by the SUT 412 to the injected actor action 514/516) is less harsh than the action 606 (e.g., a response by the SUT 412 to the injected action 614/616). In this manner, for example, the result could indicate that the exemplar outcome is less severe than the SUT outcome.

Example pseudocode is provided in Algorithm 1.
Algorithm 1
for respective log interval(s) of the log data {
  for respective timestamp(s) of the respective log interval(s) {
    for respective injected action(s) of one or more injected actions {
      simulate and score an outcome resulting from the exemplar action initial state
      simulate and score an outcome resulting from the SUT action initial state
    }
  }
}

The simulator 420 can obtain the injected actions from a variety of sources. The injected actions can be generated or synthesized. For instance, the injected actions can be synthesized or sampled from one or more probability distributions of possible actions that could be taken. A list of actions can include edge case scenarios that are helpful for validation. A list of actions can include low-probability actions that may not otherwise appear often in practice (e.g., thereby presenting challenging scenarios for machine-learned models to learn due to decreased sample sizes for training data). A list of actions can include a predetermined set of benchmark actions that are useful for probing the behavior of the SUT 412.

Log data 402 can provide a basis for obtaining a list of actions. For instance, for autonomous vehicles with a human vehicle operator (onboard, offboard), log data descriptive of vehicle operator disengages (e.g., disengaging all or part of the autonomy system) can indicate scenarios in which the autonomy systems were not operating as expected or as preferred, and thus the scenario can contain an action of interest to be injected into the simulations for evaluation.

Furthermore, log data 402 can indicate situations in which an autonomous vehicle performed suboptimally. Such situations can then provide a template for generating actions to inject into a validation scenario. For example, if log data 402 indicates suboptimal braking patterns (e.g., abrupt braking, etc.) in merge scenarios in which actors prematurely cut-in, then a premature actor cut-in action form part of a list of actions to inject into validation scenarios. In this manner, for instance, the validation system 400 can directly evaluate and score the overall effects of changes to an SUT 412 on the score or severity of the subject vehicle's response to the premature cut-in.

The results of an individual validation scenario can be combined with other results to provide a validation result for the SUT 412. For example, in some situations, individual exemplars can be a noisy reference (e.g., human drivers can demonstrate wide variation). Thus, the results over a wide range of validation scenarios can provide a less noisy evaluation of the SUT 412.

In some implementations, an average value of a performance metric from all validation scenarios can provide for a high-level evaluation of how the SUT 412 lines up with a corpus of exemplars. A difference between the average exemplar outcome and the average SUT outcome can provide a validation indicator.

In some implementations, the evaluator 450 can compute a histogram that leverages bins of score/severity to categorize and count respective validation outcomes. In this manner, for instance, deviations between the exemplars and the SUT can be more granularly examined based on the quantity of deviations as well as the severity level at which more deviations occur.

In some implementations, the evaluator 450 can slice or bin validation scenarios or outcomes based on their respective context and characteristics. The scores can then be averaged or otherwise combined over the respective bins or slices to lower the noise in the evaluation signal while also providing more granular insight into the situations in which the SUT deviates from the corpus of exemplars.

Figure 10:
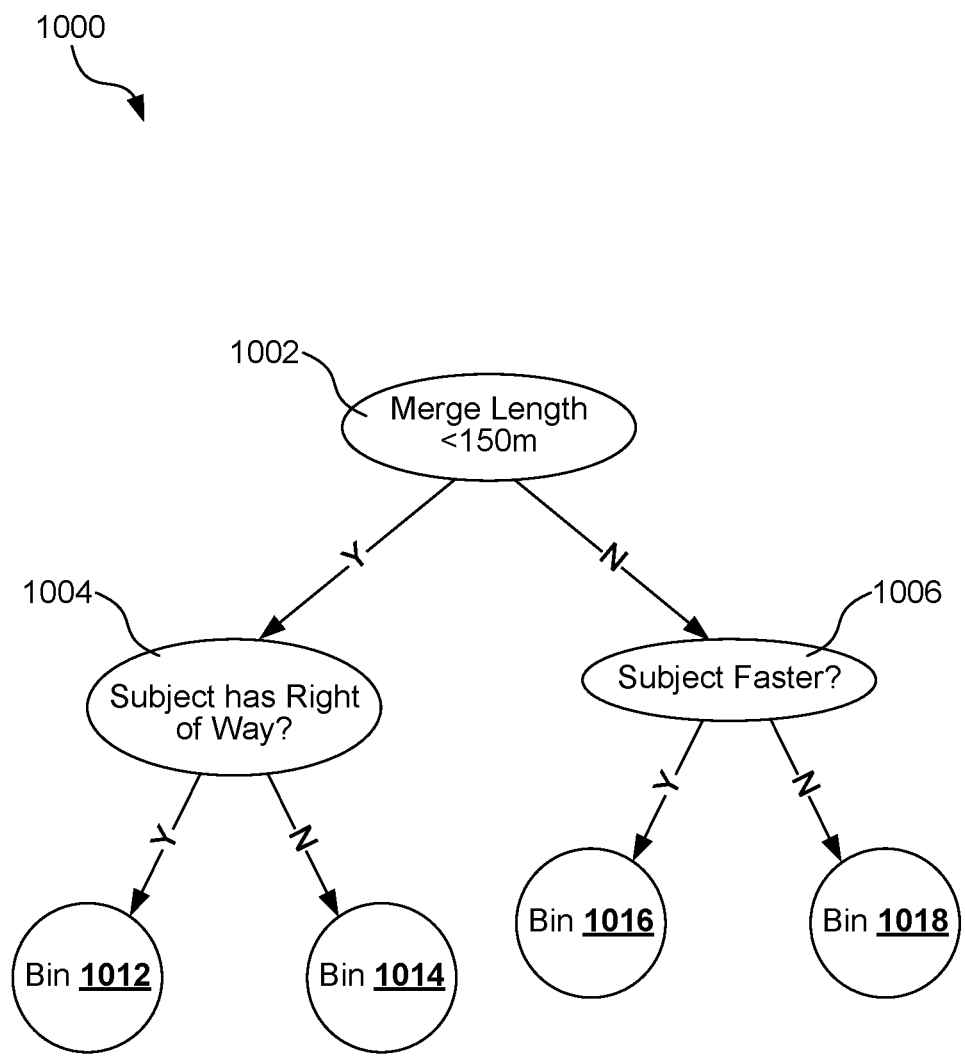
FIG. 10 is a decision tree for categorizing validation results, according to some implementations of the present disclosure.

FIG. 10 illustrates an example decision tree 1000 for categorizing validation outcomes. A root 1002 can be a node of a larger tree. Based on Boolean responses to the root 1002, further nodes 1004 and 1006 can further classify the validation scenarios. The bins 1012, 1014, 1016, and 1018 can correspond to leaf nodes.

In some implementations, the validation scenarios are binned based on interpretable features (e.g., as in FIG. 10) that correspond to metrics of interest. In this manner, for instance, the categorization can aid the identification of areas for future performance improvement, areas of current improvement or regression, etc. For instance, whether or not the subject vehicle has right of way can impact the sort of behaviors observed over the set of exemplars. For instance, exemplars might exhibit less guarding behavior when the exemplar has right of way. As such, categorizing the bins 1012 and 1014 according to the right-of-way status can provide interpretable understanding to compute more granular performance metrics. For example, evaluating the question "Does the AV guard similarly to the exemplars when the AV does not have right of way?" can include computing a performance metric comparing exemplar behavior and AV behavior in Bin 1014. Such granular performance metrics can aid further refinement and validation of AV systems under test.

In general, however, categorizing the validation scenarios based on the features of the scenarios can facilitate the prediction of performance deficits (e.g., excess severity) based on those features. The features can be latent features learned by a machine-learned model. For instance, machine-learned mixture models or other clustering models can be configured to describe a distribution of validation scenarios to identify and cluster soft groups of validation scenarios for comparison between the exemplars and the SUT 412.

Categorization can be hierarchical. A desired granularity of the hierarchy can be determined by analyzing the resulting distribution(s) of the leaf nodes or bins. For instance, the variance of examples within a bin can indicate that multiple bins are needed to better capture the variance and context-dependencies of the SUT 412 and the exemplar behavior.

Figure 11:
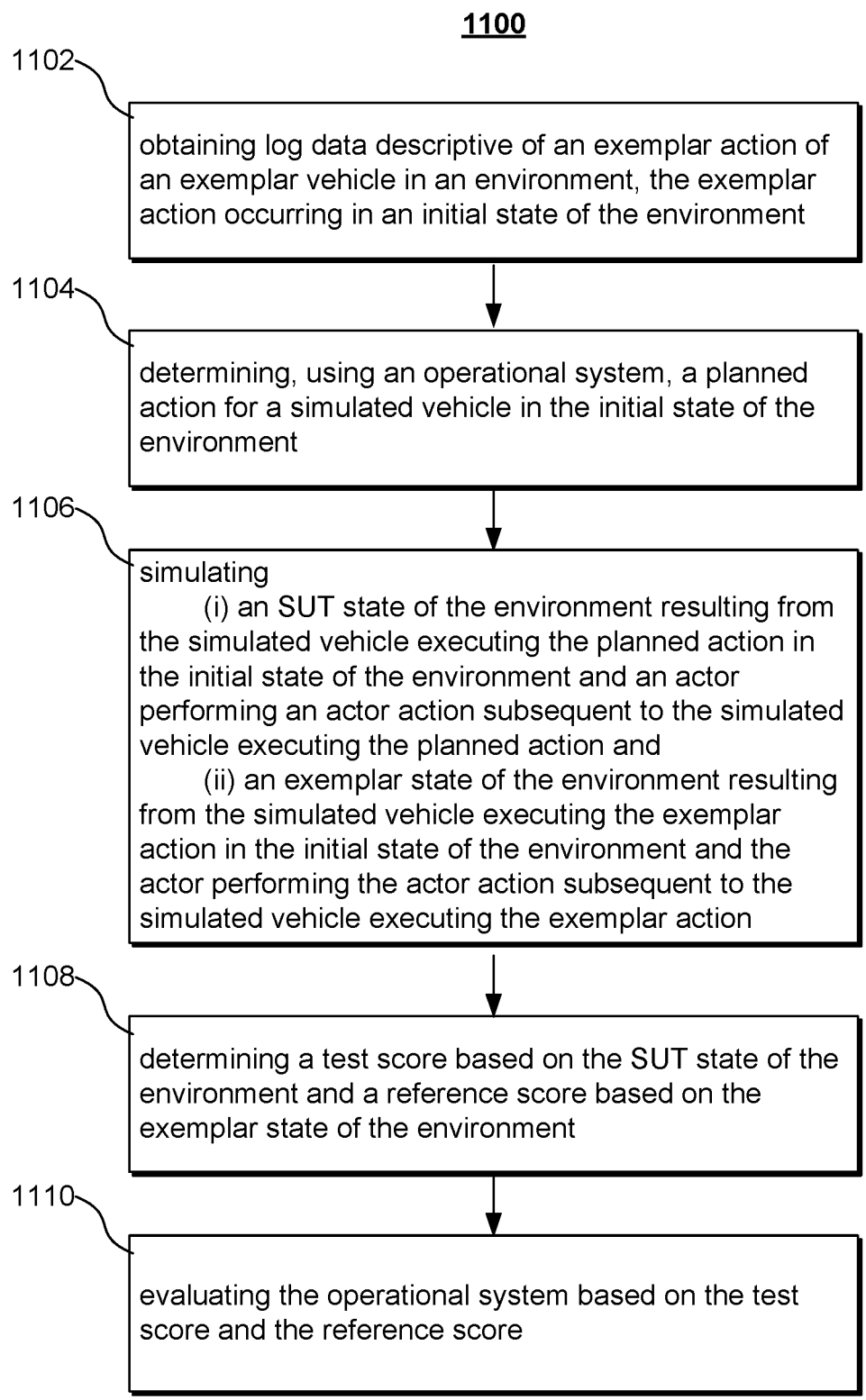
FIG. 11 is a flowchart of an example method for system validation, according to some implementations of the present disclosure.

FIG. 11 is a flowchart of a method 1100 for performing system validation according to aspects of the present disclosure. One or more portion(s) of the method 1100 can be implemented by a computing system that includes one or more computing devices such as, for example, the computing systems described with reference to the other figures (e.g., autonomous platform 110, vehicle computing system 180, remote system(s) 160, a system of FIG. 14, etc.). Each respective portion of the method 1100 can be performed by any (or any combination) of one or more computing devices. Moreover, one or more portion(s) of the method 1100 can be implemented on the hardware components of the device(s) described herein (e.g., as in FIGS. 1, 2, 14, etc.). FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 11 is described with reference to elements/terms described with respect to other systems and figures for exemplary illustrated purposes and is not meant to be limiting. One or more portions of method 1100 can be performed additionally, or alternatively, by other systems.

At 1102, the example method 1100 includes obtaining log data descriptive of an exemplar action of an exemplar vehicle in an environment, the exemplar action occurring in an initial state of the environment. The exemplar action (e.g., exemplar action 410) can correspond to a guarding behavior (e.g., guarding against an occurrence of an event, such as a low-probability event). An exemplar action 410 can, for a point in time, indicate a vehicle state of the exemplar vehicle.

At 1104, the example method 1100 includes determining, using an operational system, a planned action for a simulated vehicle in the initial state of the environment. For instance, based on a snapshot of the environment at the time at which the exemplar is executing the exemplar action 410, an operational system can be an SUT 412 that can generate (or be used to generate) a planned action for a simulated subject vehicle 406. For example, the operational system can include at least one model of an autonomous vehicle control system configured to receive sensor data and control movement of an autonomous vehicle. For instance, an SUT 412 can include one or more parts of a perception system, including perception sensors (e.g., camera, lidar, etc.) or perception models (e.g., machine-learned perception models for object recognition, tracking, etc.). For example, the SUT 412 can include a motion planning model.

At 1106, the example method 1100 includes simulating (i) an SUT state of the environment resulting from the simulated vehicle executing the planned action in the initial state of the environment and an actor performing an actor action subsequent to the simulated vehicle executing the planned action and (ii) an exemplar state of the environment resulting from the simulated vehicle executing the exemplar action in the initial state of the environment and the actor performing the actor action subsequent to the simulated vehicle executing the exemplar action. For example, FIGS. 6A-6C illustrate an example simulation of an SUT state of the environment (e.g., in FIG. 6C) resulting from the simulated vehicle executing the planned SUT action 602 (e.g., in FIG. 6A) and the actor performing actor action 614 (e.g., in FIG. 6B) subsequent to the simulated vehicle executing the planned SUT action 602. For example, FIGS. 5A-5C illustrate an example simulation of an exemplar state of the environment (e.g., in FIG. 5C) resulting from the simulated vehicle executing the exemplar action 502 (e.g., in FIG. 5A) and the actor performing actor action 614 (e.g., in FIG. 5B) subsequent to the simulated vehicle executing the exemplar action 502.

At 1108, the example method 1100 includes determining a test score based on the SUT state of the environment and a reference score based on the exemplar state of the environment. For instance, a score or severity can be determined based on the environmental state 430 and the environmental state 440. For example, the example method 1100 can include evaluating the state of the simulated vehicle in the SUT state of the environment and the state of the simulated vehicle in the exemplar state of the environment with a cost function. The cost function can be determined based on a distance to an actor boundary. The cost function can be determined based on a severity measure of an intersection with an actor boundary.

At 1110, the example method 1100 includes evaluating the operational system based on the test score and the reference score. For instance, evaluating the operational system can include measuring a difference in the scores. In some implementations, the outcomes of one or more validation scenarios can be combined, and the scores can be evaluated over group(s) or bins of the validation scenarios. For instance, the example method 1100 can include categorizing, based on one or more features of the initial state of the environment, the test score and the reference score.

The example method 1100 can include determining one or more categories for improvement associated with suboptimal test scores. For instance, the validation system 400 can provide a plurality of test scores associated with a plurality of different categories of validation scenarios. Variations among the scores of the different categories can identify categories that may be of interest to improve. The example method 1100 can include adjusting one or more parameters of the operational system corresponding to operation of the autonomous vehicle in the one or more categories for improvement (e.g., one or more hardware configurations, one or more machine-learned model parameters, etc.).

In some implementations of the example method, the actor action includes a hazard affecting the simulated vehicle. In some implementations of the example method, the actor action is selected from a plurality of actions having a probability below a threshold probability. In some implementations of the example method, the example method includes determining a reaction to the hazard affecting the simulated vehicle.

In some implementations of the example method, the exemplar action can be a guarding driving behavior to guard against occurrence of the hazard. For instance, a hazard can be an early cut-in by an actor in a merging zone. The guarding driving behavior can be a coasting or braking action.

Figure 12:
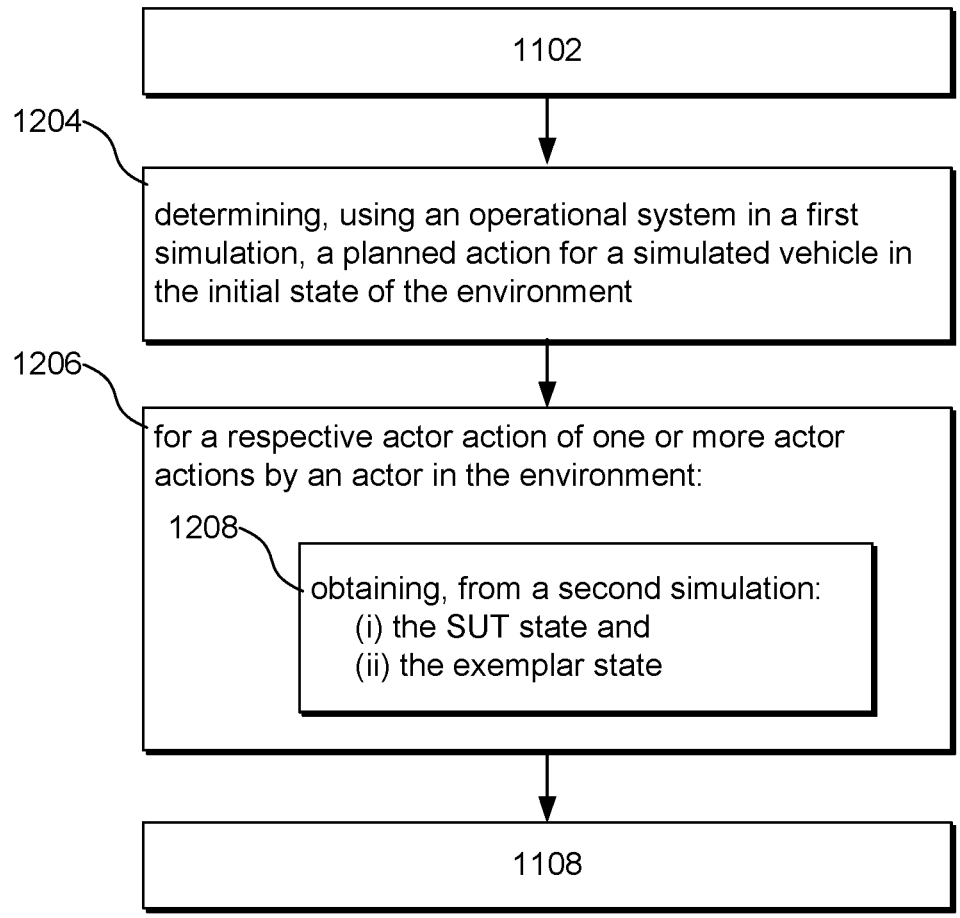
FIG. 12 is a flowchart of an example method for system validation, according to some implementations of the present disclosure.

FIG. 12 depicts an example implementation of 1100 that includes a multi-layer simulation environment. A first simulation can process the environment (e.g., initial state data descriptive of the environment) and output the planned action (e.g., for performing example method 1100 at 1104). For example, at 1204, an example implementation can include determining, using an operational system in a first simulation, a planned action for a simulated vehicle in the initial state of the environment. The first simulation can simulate the operations of the system(s) under test (e.g., one or more components of an autonomous vehicle computing system) in a simulated environment. For instance, the first simulation can input simulated sensor data into the simulated autonomous vehicle control system(s) to obtain simulated control decisions.

Within an optional loop 1206, for a respective actor action of one or more actor actions by an actor in the environment, an example implementation can include at 1208 obtaining, from a second simulation: (i) the SUT state of the environment resulting from the respective actor action occurring subsequent to the simulated vehicle executing the planned action in the initial state of the environment, and (ii) the exemplar state of the environment resulting from the respective actor action occurring subsequent to the simulated vehicle executing the exemplar action in the initial state of the environment. The second simulation can be the same as or different from the first simulation. The second simulation can be implemented by the same simulator as the first simulation. The second simulation can be implemented by a different simulator as the first simulation. The second simulation can be computed based on approximations. For instance, the second simulation can include computing conservative estimates of stopping distance, deceleration speed, lane change speed, etc. For instance, the second simulation can be configured to efficiently estimate an outer bound of a reaction to the actor action (e.g., an upper bound of stopping time or distance). For instance, the second simulation can include computing simplified analytical expressions modeling the subject vehicle motion as a projectile trajectory. In this manner, for instance, the second simulation can estimate the SUT state and exemplar state in a cost-efficient manner. The second simulation can compute the SUT states and exemplar states for multiple actor actions. For instance, given a planned action and an exemplar action, the readiness of the subject vehicle to respond to a range of various actor actions can be evaluated in the second simulation by estimating the resulting SUT states and exemplar states.

Figure 13:
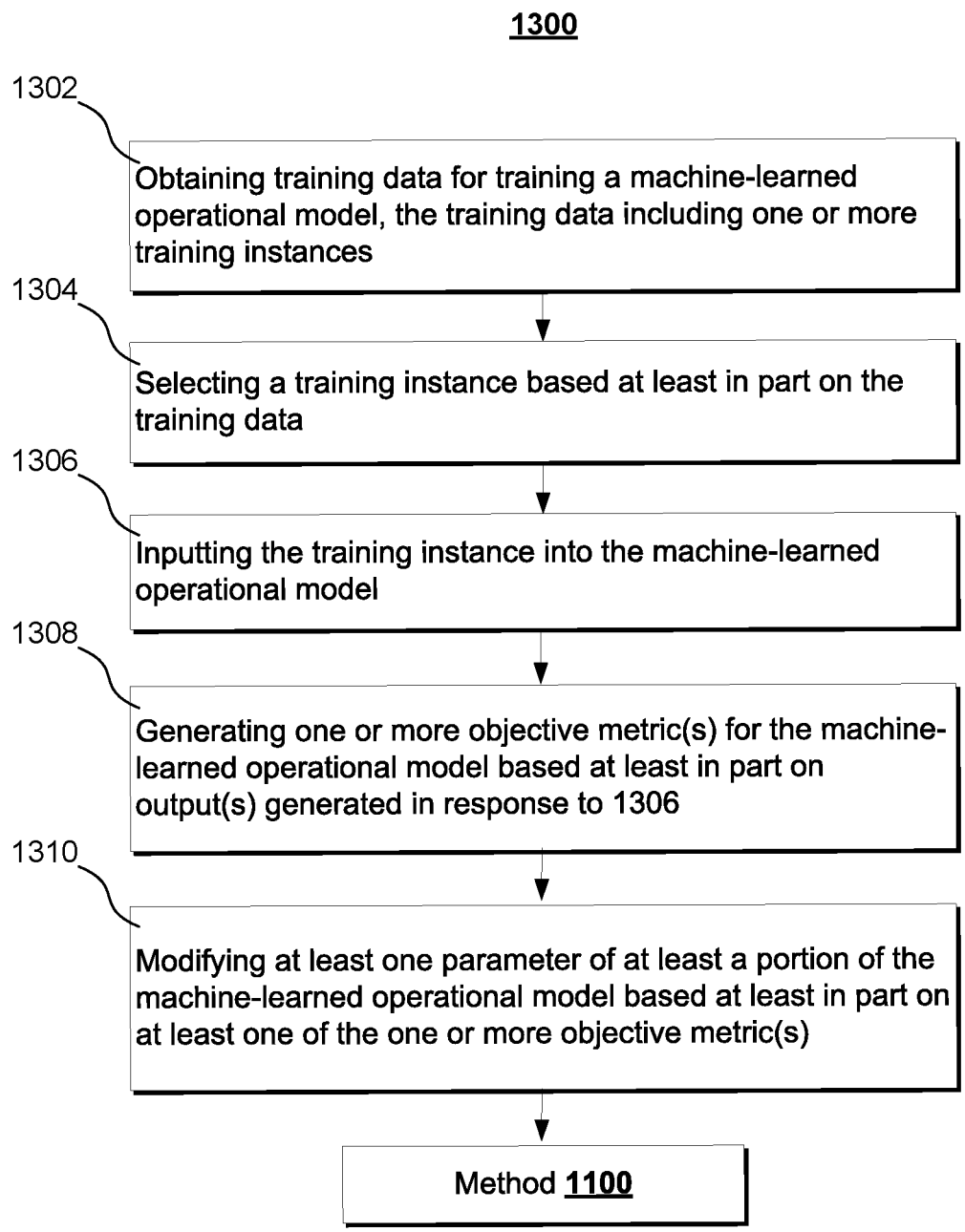
FIG. 13 is a flowchart of an example method for training and validating a machine-learned operational system, according to some implementations of the present disclosure.

FIG. 13 depicts a flowchart of a method 1300 for training one or more machine-learned operational models according to aspects of the present disclosure. For instance, an operational system (e.g., an SUT 412) can include a machine-learned operational model.

One or more portion(s) of the method 1300 can be implemented by a computing system that includes one or more computing devices such as, for example, the computing systems described with reference to the other figures (e.g., autonomous platform 110, vehicle computing system 180, remote system(s) 160, a system of FIG. 14, etc.). Each respective portion of the method 1300 can be performed by any (or any combination) of one or more computing devices. Moreover, one or more portion(s) of the method 1300 can be implemented on the hardware components of the device(s) described herein (e.g., as in FIGS. 1, 2, 14, etc.), for example, to validate one or more systems or models. FIG. 13 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 13 is described with reference to elements/terms described with respect to other systems and figures for exemplary illustrated purposes and is not meant to be limiting. One or more portions of method 1300 can be performed additionally, or alternatively, by other systems.

At 1302, the method 1300 can include obtaining training data for training a machine-learned operational model. The training data can include a plurality of training instances (e.g., reference planning data, such as labeled trajectories or strategies based on expert demonstrations).

The training data can be collected using one or more autonomous platforms (e.g., autonomous platform 110) or the sensors thereof as the autonomous platform is within its environment. By way of example, the training data can be collected using one or more autonomous vehicle(s) (e.g., autonomous platform 110, autonomous vehicle 310, autonomous vehicle 350, etc.) or sensors thereof as the vehicle(s) operates along one or more travel ways. In some examples, the training data can be collected using other sensors, such as mobile-device-based sensors, ground-based sensors, aerial-based sensors, satellite-based sensors, or substantially any sensor interface configured for obtaining and/or recording measured data.

The training data can include a plurality of training sequences divided between multiple datasets (e.g., a training dataset, a validation dataset, or testing dataset). Each training sequence can include a plurality of pre-recorded perception datapoints, point clouds, images, etc. In some implementations, each sequence can include LIDAR point clouds (e.g., collected using LIDAR sensors of an autonomous platform), images (e.g., collected using mono or stereo imaging sensors, etc.). For instance, in some implementations, a plurality of images can be scaled for training and evaluation.

At 1304, the method 1300 can include selecting a training instance based at least in part on the training data.

At 1306, the method 1300 can include inputting the training instance into the machine-learned operational model.

At 1308, the method 1300 can include generating one or more loss metric(s) and/or one or more objective(s) for the machine-learned operational model based on output(s) of at least a portion of the machine-learned operational model and label(s) associated with the training instances.

At 1310, the method 1300 can include modifying at least one parameter of at least a portion of the machine-learned operational model based at least in part on at least one of the loss metric(s) and/or at least one of the objective(s). For example, a computing system can modify at least a portion of the machine-learned operational model based at least in part on at least one of the loss metric(s) and/or at least one of the objective(s).

In some implementations, the machine-learned operational model can be trained in an end-to-end manner. For example, in some implementations, the machine-learned operational model can be fully differentiable.

After being updated, the operational model or the operational system including the operational model can be provided for validation (e.g., according to example implementations of method 1100, etc.). In some implementations, the validation system 400 can evaluate or validate the operational system to identify areas of performance deficits as compared to a corpus of exemplars. The validation system 400 can trigger retraining, decommissioning, etc. of the operational system based on, for example, failure to satisfy a validation threshold in one or more areas (e.g., guarding against one or more hazards, etc.).

In some implementations, the validation system 400 is implemented to provide cost functions for training the operational system to behave more similarly to the exemplars (e.g., for training one or more components of a machine-learned motion planning system). In some implementations, the validation system 400 is implemented to penalize nonconforming actions that do not conform to exemplar behavior.

Figure 14:
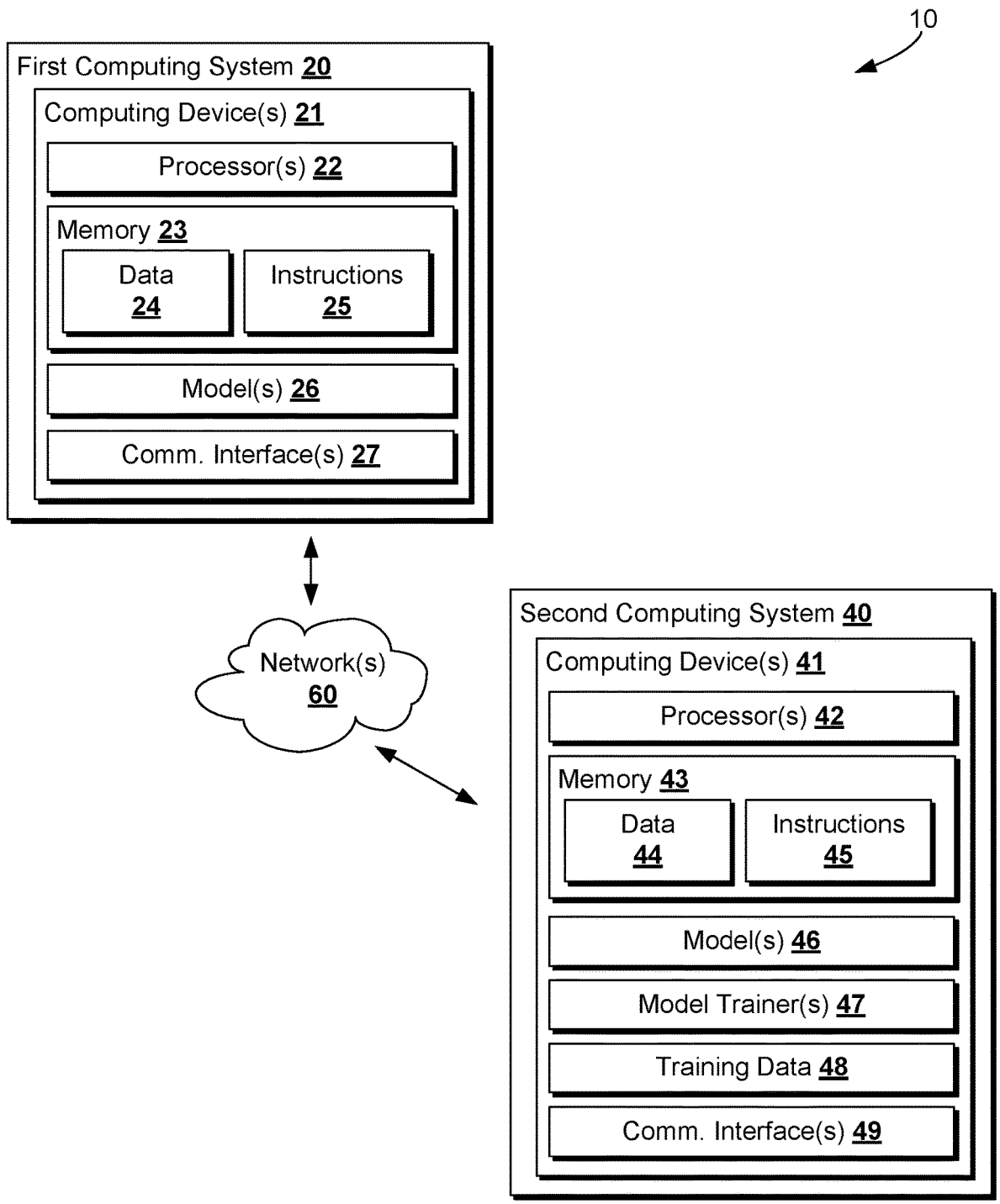
FIG. 14 is a block diagram of an example computing system for performing system validation, according to some implementations of the present disclosure.

FIG. 14 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein for validating one or more systems or operational systems (e.g., the remote system(s) 160, the onboard computing system(s) 180, the autonomy system(s) 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory device(s) that are remote from the first computing system 20.

The memory 23 can store computer-readable instructions 25 that can be executed by the one or more processors 22. The instructions 25 can be software written in any suitable programming language or can be implemented in hardware. Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein. For example, operations can include implementing system validation (e.g., as described herein).

In some implementations, the first computing system 20 can store or include one or more models 26. In some implementations, the models 26 can be or can otherwise include one or more machine-learned models (e.g., a machine-learned operational system, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system(s) 200, including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory device(s) that are remote from the second computing system 40.

The memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the autonomy system(s) 200 (e.g., localization, perception, planning, control, etc.) or other functionality associated with an autonomous platform (e.g., remote assistance, mapping, fleet management, trip/service assignment and matching, etc.). This can also include, for example, validating a machined-learned operational system.

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the model(s) 26 at the first computing system 20, the second computing system 40 can include one or more models 46. As examples, the model(s) 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system(s) 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system(s) 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train model(s) 26. For example, in some implementations, the first computing system 20 can include a computing system onboard or otherwise associated with a real or simulated autonomous vehicle. In some implementations, model(s) 26 can include perception or machine vision model(s) configured for deployment onboard or in service of a real or simulated autonomous vehicle. In this manner, for instance, the second computing system 40 can provide a training pipeline for training model(s) 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 14 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A method for validating an operational system under test (SUT) for operating an autonomous vehicle, the method comprising:
   (a) obtaining log data descriptive of an exemplar action of an exemplar vehicle in an environment, the exemplar action occurring in an initial state of the environment;
   (b) determining, using the operational system, a planned action for a simulated vehicle in the initial state of the environment;
   (c) simulating:
      (i) a response of the simulated vehicle to an actor performing an actor action subsequent to the simulated vehicle executing the planned action in the initial state of the environment to obtain an SUT state of the environment; and
      (ii) a response of the simulated vehicle to the actor performing the actor action subsequent to the simulated vehicle executing the exemplar action in the initial state of the environment to obtain an exemplar state of the environment;
   (d) determining a test score based on the SUT state of the environment and a reference score based on the exemplar state of the environment; and
   (e) evaluating the operational system based on the test score and the reference score.

2. The method of claim 1, wherein the actor action comprises a hazard affecting the simulated vehicle.

3. The method of claim 2, wherein the exemplar action is a guarding driving behavior to guard against occurrence of the hazard.

4. The method of claim 1, wherein (c) comprises simulating (i) and (ii) using a model that approximates motion of the simulated vehicle.

5. The method of claim 1, wherein (c) comprises injecting the actor action into the initial state of the environment.

6. The method of claim 5, wherein:
   the actor action is a synthesized actor action based on a set of possible actions that could be taken by the actor in the initial state of the environment.

7. The method of claim 5, wherein:
   the actor action is based on a recorded actor action obtained from other log data.

8. The method of claim 1, wherein the operational system comprises at least one model of an autonomous vehicle control system configured to receive sensor data and control movement of the autonomous vehicle.

9. The method of claim 1, wherein the test score is based on a state of the simulated vehicle in the SUT state of the environment and the reference score is based on a state of the simulated vehicle in the exemplar state of the environment.

10. The method of claim 9, wherein (d) comprises:
    evaluating the state of the simulated vehicle in the SUT state of the environment and the state of the simulated vehicle in the exemplar state of the environment with a cost function.

11. The method of claim 10, wherein the cost function is determined based on a distance to an actor boundary.

12. The method of claim 10, wherein the cost function is determined based on a severity measure of an intersection with an actor boundary.

13. The method of claim 1, wherein (e) comprises categorizing, based on one or more features of the initial state of the environment, the test score and the reference score.

14. The method of claim 13, comprising:
    (f) determining one or more categories for improvement associated with suboptimal test scores; and
    (g) adjusting one or more parameters of the operational system corresponding to operation of the autonomous vehicle in the one or more categories for improvement.

15. One or more non-transitory computer-readable media storing instructions that are executable to cause one or more processors to perform operations for validating an operational system under test (SUT) for operating an autonomous vehicle, the operations comprising:
    (a) obtaining log data descriptive of an exemplar action of an exemplar vehicle in an environment, the exemplar action occurring in an initial state of the environment;
    (b) determining, using the operational system, a planned action for a simulated vehicle in the initial state of the environment;
    (c) simulating:
       (i) a response of the simulated vehicle to an actor performing an actor action subsequent to the simulated vehicle executing the planned action in the initial state of the environment to obtain an SUT state of the environment; and
       (ii) a response of the simulated vehicle to the actor performing the actor action subsequent to the simulated vehicle executing the exemplar action in the initial state of the environment to obtain an exemplar state of the environment;
    (d) determining a test score based on the SUT state of the environment and a reference score based on the exemplar state of the environment; and
    (e) evaluating the operational system based on the test score and the reference score.

16. The one or more non-transitory computer-readable media of claim 15, wherein the actor action comprises a hazard affecting the simulated vehicle.

17. The one or more non-transitory computer-readable media of claim 16, wherein (c) comprises determining a reaction to the hazard affecting the simulated vehicle.

18. The one or more non-transitory computer-readable media of claim 16, wherein the exemplar action is a guarding driving behavior to guard against occurrence of the hazard.

19. The one or more non-transitory computer-readable media of claim 15, wherein the actor action is selected from a plurality of actions having a probability below a threshold probability.

20. An autonomous vehicle control system for controlling an autonomous vehicle, the autonomous vehicle control system comprising:
   one or more processors; and
   one or more non-transitory computer-readable media storing instructions that are executable by the one or more processors to cause the autonomous vehicle control system to control a motion of the autonomous vehicle using an operational system;
   wherein the operational system was validated by:
      (a) obtaining log data descriptive of an exemplar action of an exemplar vehicle in an environment, the exemplar action occurring in an initial state of the environment;
      (b) determining, using the operational system, a planned action for a simulated vehicle in the initial state of the environment;
      (c) simulating:
         (i) a response of the simulated vehicle to an actor performing an actor action subsequent to the simulated vehicle executing the planned action in the initial state of the environment to obtain an SUT state of the environment; and
         (ii) a response of the simulated vehicle to the actor performing the actor action subsequent to the simulated vehicle executing the exemplar action in the initial state of the environment to obtain an exemplar state of the environment;
      (d) determining a test score based on the SUT state of the environment and a reference score based on the exemplar state of the environment; and
      (e) evaluating the operational system based on the test score and the reference score.

* * * * *

UNITED STATES PATENT AND TRADEMARK OFFICE
CERTIFICATE OF CORRECTION

PATENT NO. : 12,084,085 B1
APPLICATION NO. : 18/309494
DATED : September 10, 2024
INVENTOR(S) : James Andrew Bagnell et al.

Page 1 of 1

It is certified that error appears in the above-identified patent and that said Letters Patent is hereby corrected as shown below:

In the Claims

Column 34, Line 29: should read "associated with test scores; and" instead of "associated with suboptimal test scores; and"

Signed and Sealed this
Twenty-seventh Day of January, 2026

John A. Squires
*Director of the United States Patent and Trademark Office*